United States Patent [19]

Asano et al.

[11] Patent Number: 4,841,436
[45] Date of Patent: Jun. 20, 1989

[54] TAG DATA PROCESSING APPARATUS FOR A DATA FLOW COMPUTER

[75] Inventors: Hajime Asano, Toyonaka; Hiroaki Terada, Suita; Katsuhiko Asada, Amagasaki; Hiroaki Nishikawa, Suita; Masahisa Shimizu, Kadoma; Hiroki Miura, Hirakata; Kenji Shima, Nishinomiya; Shinji Komori, Itami; Souichi Miyata, Shiki; Satoshi Matsumoto, Uda, all of Japan

[73] Assignees: Matsushita Electric Industrial Co., Ltd., Kadoma; Sanyo Electric Co., Ltd., Moriguchi; Mitsubishi Denki Kabushiki Kaisha, Tokyo; Sharp Corporation, Osaka, all of Japan

[21] Appl. No.: 868,701

[22] Filed: May 30, 1986

[30] Foreign Application Priority Data

May 31, 1985 [JP] Japan .................. 60-119034

[51] Int. Cl.$^4$ .......................................... G06F 9/18
[52] U.S. Cl. .......................... 364/200; 364/232.22; 364/244; 364/244.3

[58] Field of Search ... 364/200 MS File, 900 MS File

[56] References Cited

U.S. PATENT DOCUMENTS

| | | | |
|---|---|---|---|
| 4,128,882 | 12/1978 | Dennis | 364/200 |
| 4,145,733 | 3/1979 | Misunas et al. | 364/200 |
| 4,197,589 | 4/1980 | Cornish et al. | 364/900 |
| 4,591,979 | 5/1986 | Iwashita | 364/200 |
| 4,675,806 | 6/1987 | Uchida | 364/200 |

Primary Examiner—Eddie P. Chan
Assistant Examiner—Jonathan C. Fairbanks
Attorney, Agent, or Firm—Cushman, Darby & Cushman

[57] ABSTRACT

A tag data processing apparatus is described for use in a data flow computer utilizing a tagged token scheme. A tag adding process and tag restoring process are executed by using pipeline registers, a queue memory and simple control circuit, thereby obtaining high speed operation and superior throughput without the need for a tag memory table, complicated operation-test circuitry or a sequence control circuit.

2 Claims, 8 Drawing Sheets

Field disposition

FIG. 3 (b)

Input token

FIG. 3 (c)

Output token

FIG. 3 (d)

Input token

FIG. 3 (e)

No output token

TAG DATA PROCESSING APPARATUS FOR A DATA FLOW COMPUTER

BACKGROUND OF THE INVENTION

1. Field Of The Invention

The present invention is generally related to a tag data processing apparatus (hereinafter referred to simply as a data processing apparatus), and more particularly to a data processing apparatus used for a data flow computer utilizing a tagged token scheme.

2. Description Of The Related Art

Figure 6:
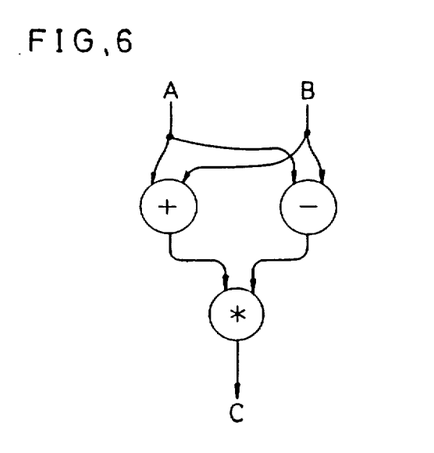
FIG. 6 is a data flow diagram of a calculation according to a data flow system.

FIG. 6 is a data flow diagram showing a compiled program of $C=(A+B)*(A-B)$. Respective nodes correspond to instructions of the data flow computer. The data are carried on tokens which flow on arcs connecting the nodes. Each arc is a first in-first out queue and can hold an unbounded number of tokens.

When the subroutine program in FIG. 6 is called and parallel-executed by two different master programs (P, Q) at the same time, two kinds of tokens corresponding to the two master programs P and Q exist on the same arc of the data-flow diagram of FIG. 6. In order to execute each operation without confusion under the above-mentioned condition, a method known as a tagged token scheme is used. Each token is added with an environment identifier (tag) indicating which master program calls the subroutine program. In a tagged token scheme, a group of tokens having the same tag are matched together as one operand and processed.

In order to efficiently realize the tagged token control scheme in a data flow computer, a data processing apparatus is provided for adding the tag, for renewing or reinitializing a used tag and for storing a tag capable of being used.

The conventional data processing apparatus is described as follows.

Figure 7:
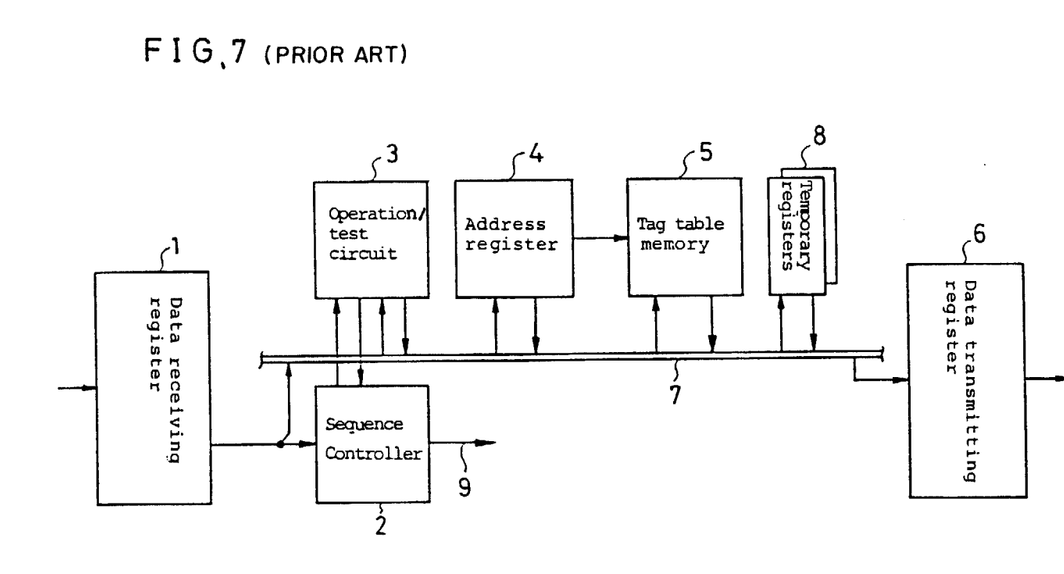
FIG. 7 is a block diagram showing a conventional tag data processing apparatus.

FIG. 7 is a block diagram showing an example of a conventional data processing apparatus which uses a tag managing table (for example, Japanese patent unexamined patent application No. Sho 59-27352).

In FIG. 7, a tag table memory 5 stores a tag capable of being used. The tag table memory 5 comprises a tag field and empty/full indication field. Reading and writing of the tag table memory 5 are executed using the contents of an address register 4.

The tag adding process is described as follows. A receiving data register 1 receives a tag adding instruction in a conventional manner. A sequence controller 2 decodes the content of the receiving data register 1. When the content corresponds to a tag add request, the sequence controller 2 executes a so called hash function using the tag field value of the content as a key. The hash function also utilizes an operation/test circuit 3 and temporary data register 8.

The hash function is a well known method for distributing data more or less randomly over a number of different addresses. Once the hash function is executed, the result is written in the address register 4. The tag memory table 5 is read according to the content of the address register 4.

It can be determined whether the tag in the address is usable (empty) or being used (full) by examining the empty/full indication field. When the empty/full indication field is full, another address is searched in accordance with, for example, an open hash method or chain method for detecting an empty tag. When the empty tag is detected, the content of the address register 4 is written in a tag field of a transmitting data register 6 in order to associate a new tag to the address detected as having an empty tag. The other field of the transmitting data register 6 is written with the content of the receiving data register 1.

The following operation is executed as a post processing operation. The sequence controller 2 performs an edit function combining the tag and the empty/full indication field (the bit of which is full), and writes it in the tag table memory 5, thereby completing the operation for the tag adding instruction.

The used-tag-restoring process is described as follows. When the receiving data register 1 receives the tag restoring instruction issued from another apparatus, the sequence controller 2 decodes the contents of the receiving data register 1. If the sequence controller 2 recognizes the tag restoring request, the content of the tag field of the receiving data register 1 is written to the address register 4. The content of the tag table memory 5 is read in accordance with the address, and the detected tag field value is written to the tag field of the transmitting data register 6. With respect to content other than the tagged field, the content of the receiving data register 1 is written as it is.

Then, the following post-processing process is executed. The sequence controller 2 causes the operation/test circuit 3 to issue all zero data and writes the zero data to the empty/full field and the tag field of the tag memory 5 in accordance with the addresses in the address register 4. Thus, the tag restoring instruction is completed.

In a conventional data processing apparatus, the architecture is complicated since both the operation/test circuit 3 and the sequence controller 2 etc. are needed. Further, the manipulation with regard to address register 4 and the tag table memory 5 is troublesome. The processing is made sequentially by means of the sequence controller 2, and therefore excessive processing time is needed for adding tags and for restoring tags. Accordingly, a data flow computer using a conventional data processing apparatus is difficult to execute at high speed operation.

OBJECT AND SUMMARY OF THE INVENTION

The object of the present invention is to resolve the above-mentioned problems of a conventional tag data processing apparatus. The present invention provides a tag data processing apparatus with a simple construction capable of adding the tag and restoring the tag at a high speed.

The tag data processing apparatus of the present invention utilizes pipeline registers for transmitting tagged tokens, a queue memory for storing the tags of the tokens, and a control circuit having a tag restoring instruction for making the queue memory restore the tags of the tagged tokens. The control circuit utilizes the pipeline processing scheme, wherein the tag read from the queue memory is written or associated to a token which has a tag adding instruction. The written tag is then deleted from the queue memory.

The tag data processing apparatus of the present invention has the following technical advantages. The construction is very simple and the tag-adding and tag-restoring processing, which are necessary in a data flow computer using tagged tokens, are executed at high speed by a pipeline register. Further, the tag data processing apparatus operates as the queue buffer memory for temporarily storing the input token and the output or result token. Therefore, the tag data processing apparatus is extremely useful.

Other and further objects, features and advantages of the invention will be described more fully in the following descriptions.

DESCRIPTION OF THE PREFERRED EMBODIMENT

Figure 1:
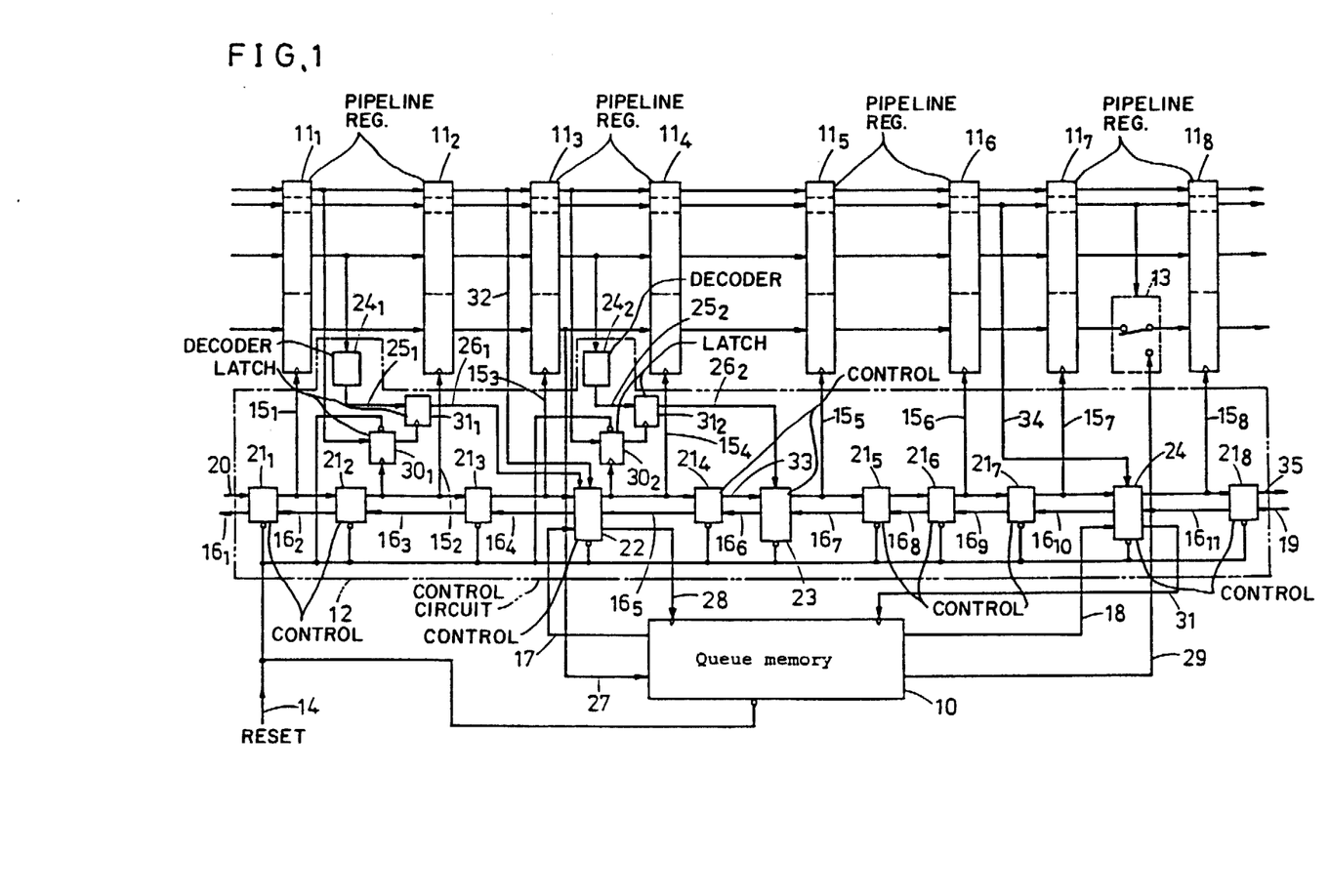
FIG. 1 is a block diagram showing a first embodiment of a tag data processing apparatus of the present invention.
Figure 2A:
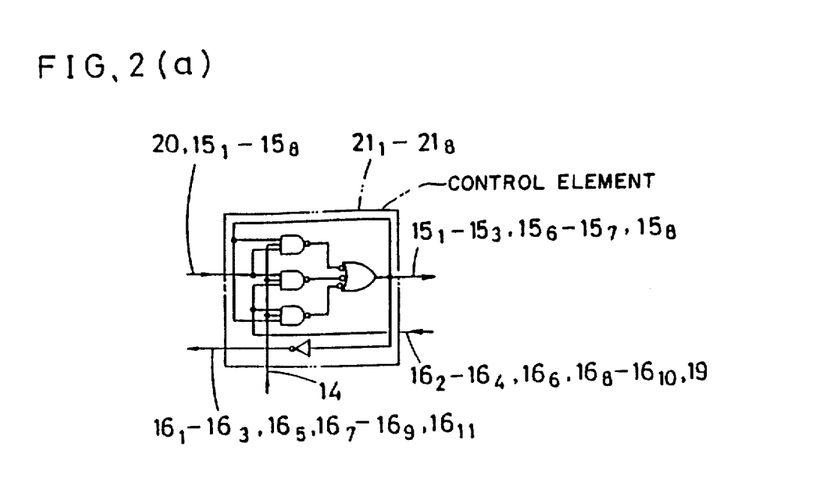
FIG. 2(a), FIG. 2(b), FIG. 2(c) and FIG. 2(d) are circuit diagrams each showing fundamental elements of a control circuit of the first embodiment of FIG. 1.
Figure 2B:
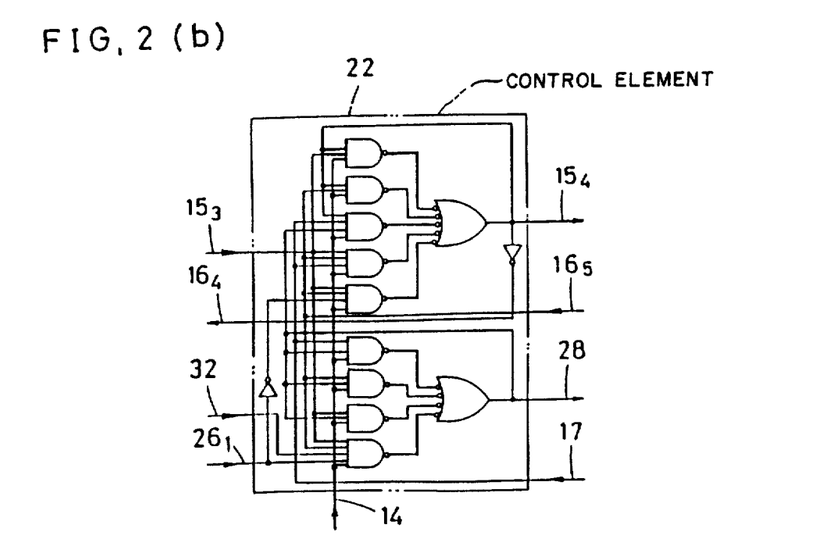
Figure 2C:
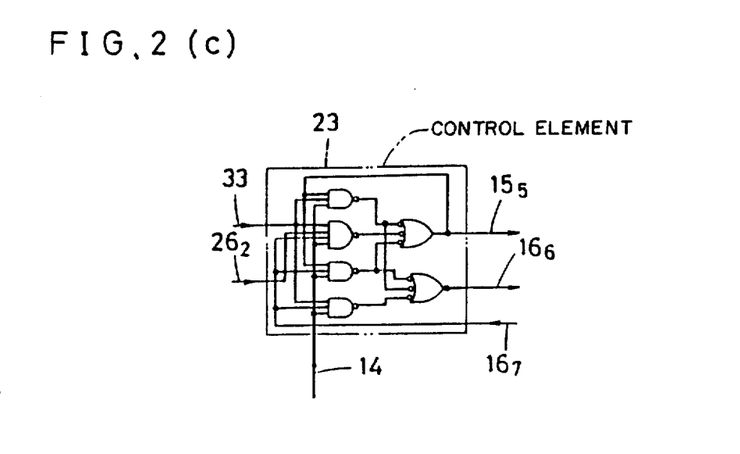
Figure 2D:
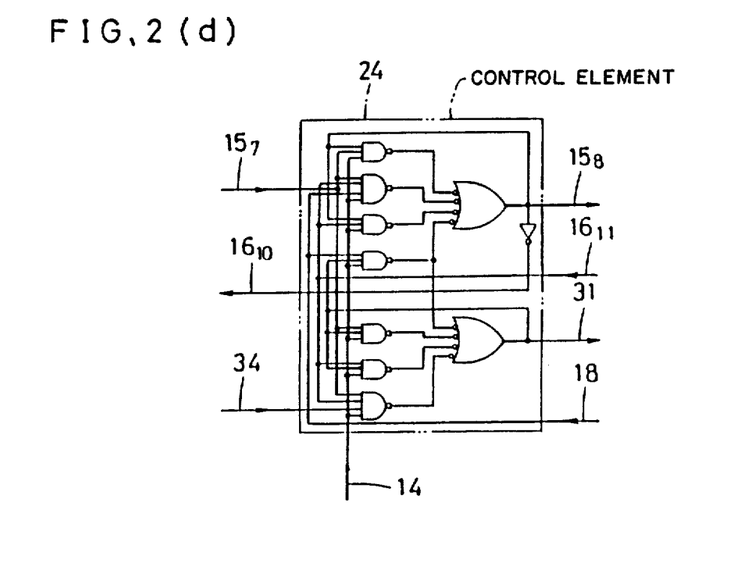

FIG. 1 is a block diagram of a first embodiment of a tag data processing apparatus of the present invention. A queue memory 10 stores usable tags. A so called FIFO (first in-first out) memory, for example the MMI Co. C67401 which is well known and commercially available, can be used as the queue memory. A control circuit 12 controls pipeline registers $11_1$, $11_2$, $11_3$, $11_4$, $11_5$, $11_6$, $11_7$ and $11_8$ and the queue memory 10. The pipeline registers $11_1$–$11_8$ and the control circuit 12 execute the functions of tag adding and tag restoring by means of a pipeline processing scheme.

Fundamental elements of the control circuit 12 are shown in FIG. 2(a), FIG. 2(b), FIG. 2(c) and FIG. 2(d). Latches $30_1$, $30_2$, $31_1$ and $31_2$ are included in the control circuit 12 as shown in FIG. 1.

Figure 3A:
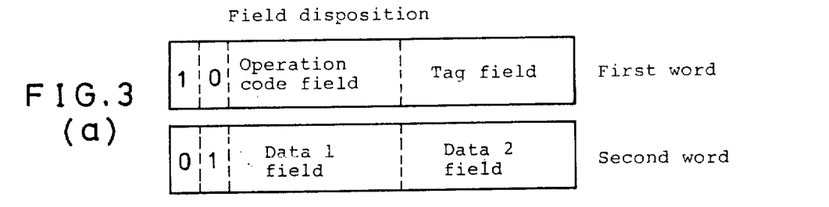
FIG. 3(a), FIG. 3(b), FIG. 3(c) FIG. 3(d) and FIG. 3(e) are diagrams each showing the field contents of a token commonly used in the first embodiment and in a second embodiment of the present invention.

FIG. 3(a), FIG. 3(b), FIG. 3(c), FIG. 3(d) and FIG. 3(e) show the field contents of a token applied to and issued from the data processing apparatus of FIG. 1. FIG. 3(a) is a diagram showing disposition of each field. The applied and the issued token comprise two words.

Figure 3B:
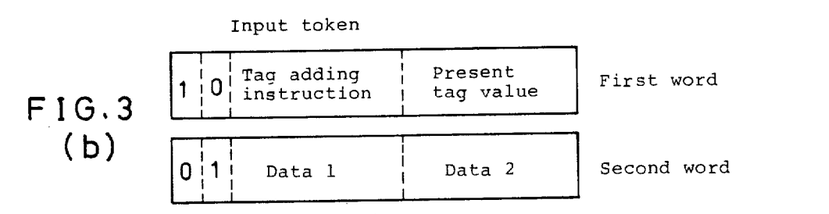
Figure 3C:
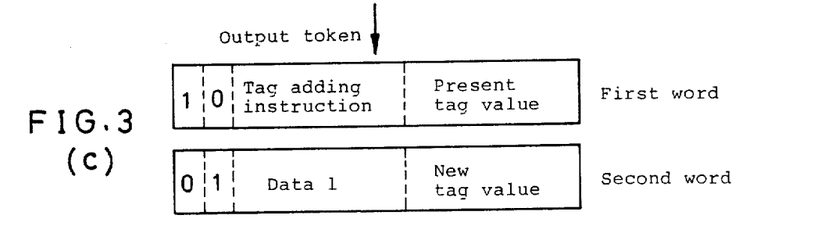
Figure 3D:
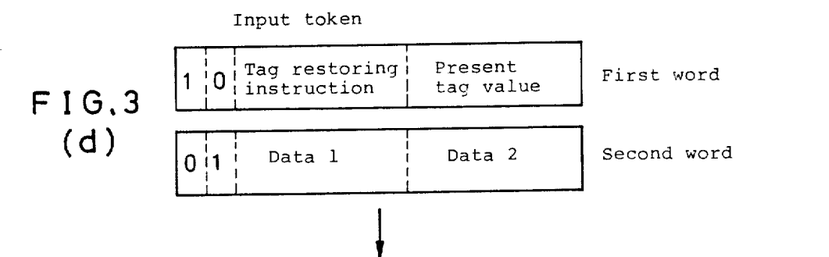
Figure 3E:
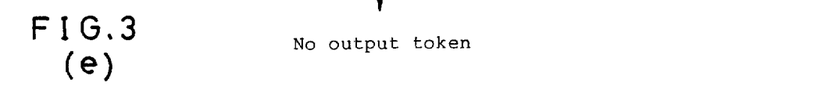

In an operation code field shown in FIG. 3(a), either a tag adding instruction code or tag restoring instruction code may be written. FIG. 3(b) shows an input token with the tag adding instruction. FIG. 3(c) shows an output token in which the tag is added. The content of each field of the input token is the same as the content of each field of the output token except that the newly added tag value is written to a data 2 field of the input token. FIG. 3(d) shows an input token having the tag restoring instruction. The tag field value of the input token is restored to the queue memory 10. Then, the contents of the input token are erased as shown in FIG. 3(e) and the output token is not issued. Otherwise, the input token can be issued as the output or result token without being erased, as in the conventional data processing apparatus.

The tag adding process and the tag restoring process are described in detail referring to FIG. 1.

An initializing method for the data processing apparatus of FIG. 1 and the tag restoring process are as follows.

When initializing, a reset signal 14 is set to logical "0" and the queue memory 10 is erased. Additionally, latch signals $15_1$–$15_8$ are set to logical "0". At the same time response signals $16_1$–$16_{11}$ and 17 are all set to logical "1". Logical "0" as used herein means a low level of voltage ($-0.5$ to $+0.4$ V). Logical "1" means a high level of voltage ($+2.4$ to $+5.5$ V). Under the foregoing conditions, it is necessary to load usable tags in the queue memory 10. The tag loading process is the same as the tag restoring process. Therefore, the description of the tag restoring process suffices also for tag loading.

The tag restoring process starts with the input of the tag restoring instruction. That is, when the response signal $16_1$ is logical "1", a first word of the input token having the tag restoring instruction is applied to the input of the pipeline register $11_1$ from another apparatus, and the input request signal 20 becomes logical "1". Then, a control element $21_1$ (a so called Muller's C-element) examines whether a response signal $16_2$ from a next step is logical "1" or not. When the response signal $16_2$ is logical "1", the control element $21_1$ switches the latch signal $15_1$ to logical "1"; and when the response signal $16_2$ is logical "0". The control element $21_1$ switches the latch signal $15_1$ to logical "1" when the response signal $16_2$ is logical "1". Only when the input request signal 20 and the response signal $16_2$ from the next step are logic "1", does the control element $21_1$ cause the latch signal-$15_1$ change from logical "1" to "0". Likewise, when both the input request signal 20 and the response signal $16_2$ are logical "0", the control element $21_1$ switches the latch signal $15_1$ from logical "1" to logical "0".

A response signal $16_1$ is sent by inverting the latch signal $15_1$. The above-mentioned operations are common with regard to the control elements $21_1$–$21_8$. The first word of the input token is latched to the pipeline register $11_1$ by the switching (logical "0" to logical "1") of the latch signal $15_1$. The latched first word is next latched to a pipeline register $11_2$ by the like operation of control element $21_2$.

A second word of the input token can be applied when the response signal $16_1$ is logical "1", and is applied in the same manner as the first word. Likewise, the input token is advanced through the pipeline registers.

Decoders $24_1$ and $24_2$ have the same structure. Each decoder $24_1$ and $24_2$ decodes an operation code field of the first word of the input token. When the operation code corresponds to a "tag restoring instruction", the decoders $24_1$ and $24_2$ switch output signals $25_1$ and $25_2$ to logical "1" respectively. When the operation code corresponds to a "tag adding instruction", the decoders $24_1$ and $24_2$ turn the output signals $25_2$ and $15_2$ to logical "0", respectively.

The control element 22 applies the tag field content of the first word of the input token advancing through the pipeline registers, to the queue memory 10 by using a data line 27 and a push signal 28. This is done only when the input token has a tag restoring instruction, that is, when a flag signal $26_1$ is logical "1". A distinction is made between the first word and the second word by the logical value of a header signal 32.

When the header signal 32 is logical "1", the data stored in the pipeline register $11_2$ corresponds to the first word, and when the header signal 32 is logical "0", the data stored in the pipeline register $11_2$ corresponds to the second word. FIG. 3 shows this distinction. When the tag field content is restored in the queue memory 10, and after a latch signal $15_3$, and response signals 17 and $16_5$ become logical "1", the control element 22 switches the signal 28 to logical "1". Further, the control element 22 switches the push signal 28 to logical "0" after the latch signal $15_3$ and the response signal 17 and $16_5$ become logical "0".

When input token is a tag adding instruction, that is, when the flag signal $26_1$ is logical "0", the control element 22 transmits the input token to the next pipeline register $11_4$ with the same operation as the control elements $21_1$–$21_8$.

When the input token is a tag restoring instruction, a control element 23 produces a response signal $16_6$ without changing the latch signal $15_5$ to logical "1" for the input token, in order to process a succeeding token. Also, the flag signal $26_2$ is logical "1" and the output data of the pipeline register $11_4$ is not latched into the pipeline register $11_5$. Thus, the input token is cancelled. On the other hand, when the input token is a tag-adding instruction, that is, the flag signal $26_2$ is logical "0", the control element 23 only transmits the input token to the next pipeline register with the same operation as those of the control elements $21_1$–$21_8$.

In summary, when the input token is a tag restoring instruction, the content of the tag field of the first word of the input token is applied to the queue memory 10 by the control element, and the input token is erased by the control element 23. When the input token is the tag adding instruction, the input token is not operated on and advances through the pipeline registers and reaches the pipeline register $11_7$.

The tag-adding process is described as follows. As mentioned above, when the input token has a tag adding instruction, the input token advances to the pipeline register $11_7$. When there is any usable tag in the queue memory 10 and the tag can be issued, that is, when an output ready signal 18 is logical "1", a control element 24 switches the latch signal $15_8$ from logical "0" to logical "1", and the input token is latched by the pipeline register $11_8$. Furthermore, when the first word of the input token is latched, that is, when a tail signal 34 is logical "0" and the second field of the output of the pipeline register $11_7$ is logical "0", a data multiplexer 13 produces a data routine as shown in FIG. 1. Therefore, the output of the pipeline register $11_7$ is transmitted to the pipeline register $11_8$ as it is, and is latched.

When the second word of the input token is latched, that is, when the tail signal 34 is logical "1" and the second field of the output of the pipeline register $11_7$ is logical "1", the data multiplexer 13 exchanges the data route. A different data route is effected such that an output data line 29 of the queue memory 10 is connected to the input lead of the pipeline register $11_8$. Therefore, the tag value is written as a fourth field (data 2 field) of a data word latched to the pipeline register $11_8$. The contents of the other fields of the data latched to the pipeline register $11_8$ are the same as those of the data issued from the pipeline register $11_7$. Thus, the output token having added a new tag is shown in FIG. 3(c) and is issued by the action of a control element $21_8$.

At this time, the control element $21_8$ informs external circuitry that the issuing of the token is imminent by producing a logical "1" output ready signal 35 after switching a response signal 19 to logical "1". When the control element $21_8$ recognizes that the token has been received by external circuitry, by detecting the logical "0" of the response signal 19, the control element $21_8$ switches the output ready signal 35 to logical "0". The first word is issued in the above-mentioned manner. Next, the second word is latched and a so called trigger signal 31 varies as "0"→"1"→"0" when the latching is completed, that is, as latch signal $15_8$ varies "0"→"1"→"0". The added tag value is swept out in accordance with the timing of the negative edge of the trigger signal transition. Thus, the tag-adding processing and this added-tag-value-sweeping processing are executed concurrently.

The above-mentioned tag restoring process and the tag adding process are executed by a pipeline. Therefore, both processing functions can occur in the data processing apparatus of FIG. 1 at the same time. That is, the data processing apparatus of the present invention can execute the foregoing pipeline processing scheme in parallel. Accordingly, the data processing apparatus of the present invention can execute faster and has superior processing capability than the conventional apparatus. Further, the data processing apparatus itself can operate as a queue buffer memory due to the existence of the pipeline registers.

The data processing apparatus according to the present invention does not need special, custom made component elements for the operation/test circuit, the sequence controller etc. The data processing apparatus can be comprised of general purpose, off the shelf components such as pipeline registers $11_1$–$11_8$, queue memory 10, data multiplexer 13 and a structurally simple control circuit.

In the above embodiment, the input token has a two word composition as shown in FIG. 3. However, the data processing apparatus can be applied to an input token having three or more words or only one word. In the case of an input token having one word, the control circuit 12 has a simple structure, and the multiplexer 13 is not needed.

Figure 4:
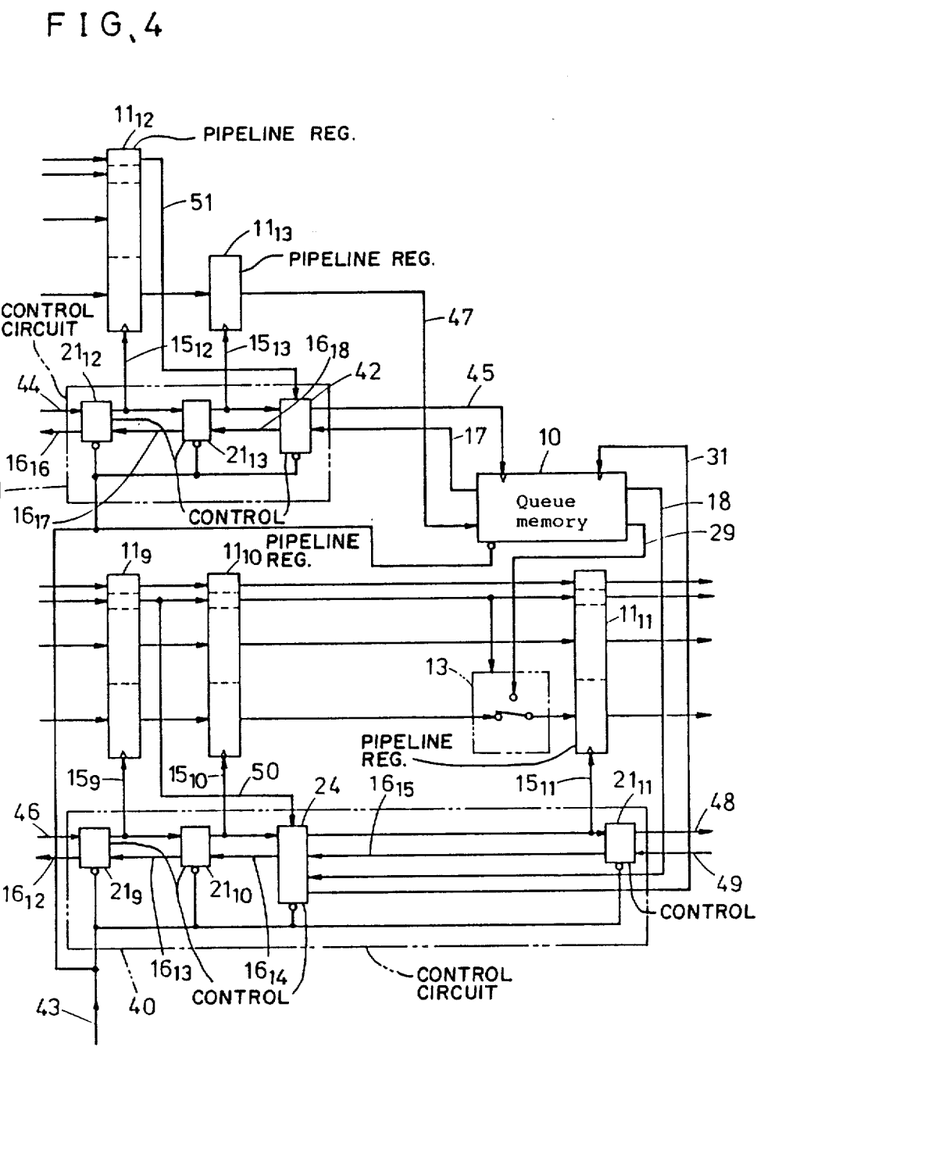
FIG. 4 is a block diagram showing a second embodiment of the tag data processing apparatus of the present invention.

FIG. 4 is a block diagram of a second embodiment of the data processing apparatus of the present invention. The queue memory 10 and pipeline registers $11_9$–$11_{13}$ are the same as those of the first embodiment. The queue memory 10 stores usable tags. The pipeline registers $11_9$–$11_{11}$ and a control circuit 40 which is connected with the queue memory 10 execute the tag adding process. The pipeline registers $11_{12}$, $11_{13}$ and a control circuit 41, which is connected with the queue memory 10 execute the tag restoring process.

In the second embodiment, the token having the tag-restoring instruction and the token having the tag-adding instruction are distinguished before being applied to the circuit of FIG. 4. The token having a tag-restoring instruction is applied to an input end of the pipeline register $11_{12}$ and the token having tag-adding instruction is applied to an input lead of the pipeline register $11_9$.

Figure 5A:
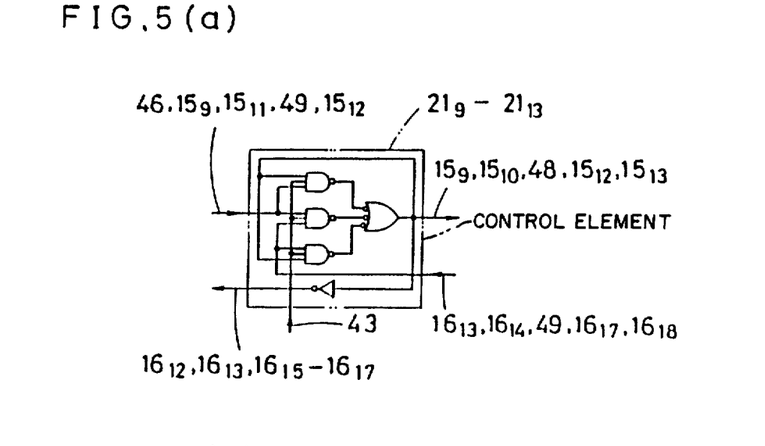
FIG. 5(a), FIG. 5(b) and FIG. 5(c) are circuit diagrams each showing fundamental elements of a control circuit of the second embodiment of FIG. 4.
Figure 5B:
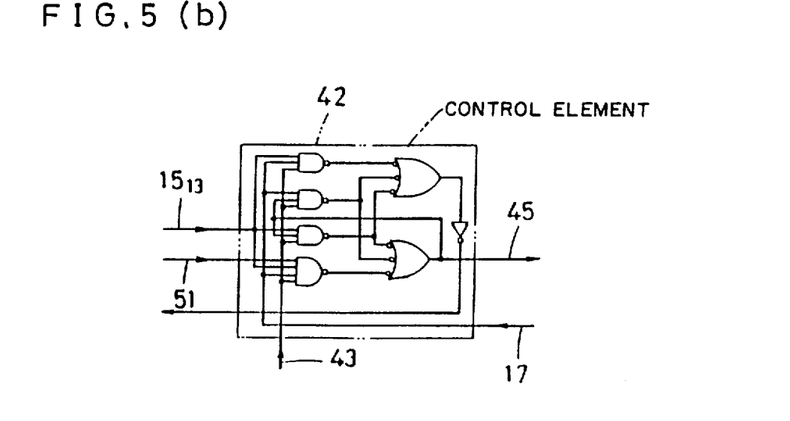
Figure 5C:
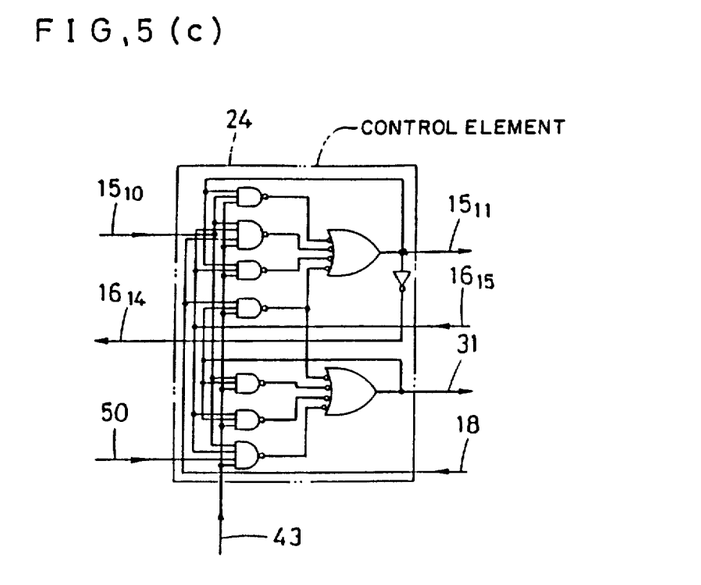

FIG. 5(a), FIG. 5(b) and FIG. 5(c) are detailed diagrams of the elements of the control circuit 40 and the control circuit 41. Control elements $21_9$–$21_{13}$ are the same as the control elements $21_1$–$21_8$ of the first embodiment. A control element 24 is the same as that of the first embodiment.

A second embodiment is described wherein the input token and the output token are the same as those of FIG. 3.

The tag-adding process and the tag-restoring process are described in detail referring to FIG. 4 as follows.

First, an initializing method for the data processing apparatus of the second embodiment and the tag restoring method are described.

For initializing, a reset signal 43 is switched to logical "0". The queue memory 10 is evacuated and latch signals $15_9$–$15_{13}$ and a push signal 45 are switched to logical "0". At the same time, response signals $16_{12}$–$16_{18}$ and 17 become logical "1". Under such conditions, it is necessary to load usable tags into the queue memory 10. Like the first embodiment, the tag loading process is the same as the tag-restoring process. Therefore, the description of the tag-loading process may be omitted.

The tag-restoring process starts with the input of an input token having the tag restoring instruction. That is, when the response signal $16_{16}$ is logical "1", the first word of the input token having the tag restoring instruction is applied to the input of the pipeline register $11_2$ and an input request signal 44 is produced at a logical "1" level. At this time, control element $21_{12}$ examines whether the response signal $16_{17}$ for the next step is logical "1" or not. When the response signal $16_{17}$ is logical "1" a latch signal $15_{12}$ is switched to logical "1", and when the response signal $16_{17}$ is logical "0", the latch signal 15 becomes logical "1" only after response signal $16_{17}$ is logical "1".

The first word of the input token is latched to the pipeline register $11_{12}$ with the latch signal $15_{12}$ being changed from logical "0" to logical "1". Next, the content of the tag field of the latched first word is latched to the pipeline register $11_{13}$ by a similar operation of the control element $21_{13}$. Then, (when the response signal $16_{16}$ is "1") the second word of the input token is applied to the pipeline register in the same manner as the first word.

The control element 42 produces a push signal 45 at a logical "1" level and applies the content of the tag field of the first word to the queue memory 10 through a data line 47 only when the content of the pipeline register $11_{13}$ is the tag field of the first word. The control element 42 switches push signal 45 to logical "1", after the latch signal $15_{13}$ and the response signal 17 become logical "1". The control element 42 switches the push signal 45 to logical "0" after the latch signal $15_{13}$ and the response signal 17 becomes logical "0".

When the content of the pipeline register $11_{13}$ is the data 2 field of the second word, that is, when the header signal 51 is logical "0", the response signal $16_{18}$ is varied so as to request the next data word. Meanwhile, the push signal 45 is maintained at a logical "0". That is, only the content of the tag field of the first word of the input token is applied to the queue memory 10 by the pipeline register. The contents of the other field of the first word and the second word are erased. Thus, the tag restoring process is completed.

The tag adding processing is described as follows.

The tag adding process starts from the input of the input token with a tag-adding instruction. That is, when the response signal $16_{12}$ is logical "1", the first word of the input token with the tag adding instruction is applied to the input of the pipeline register $11_9$ and the input request signal 46 is switched to logical "1". The subsequent input sequence of the input tokens is the same as the sequence of the input tokens of the tag-restoring instruction. The input token advances receiving no operation until the first word is latched to the pipeline register $11_{10}$.

When any usable tag is restored in the queue memory 10 and is capable of being issued, that is, when an output ready signal 18 is logical "1", the control element 24 switches the latch signal $15_{11}$ to logical "1" and the input token is latched to the pipeline register $11_{11}$. When the first word of the input token is latched, that is, when the tail signal 50 is logical "0" and the second field of the output token of the pipeline register $11_{10}$ is logical "0", the data multiplexer 13 executes a data route as shown in FIG. 4. The output data of the pipeline register $11_{10}$ is transmitted to the input of the pipeline register $11_{11}$ and is latched.

When the second word of the input token is latched, that is, when the tail signal is logical "1" and the second field of the output of the pipeline register $11_{10}$ is logical "1", the data multiplexer 13 changes the data route such that the output data line 29 of the queue memory 10 is connected to the input of the pipeline register $11_{11}$. The tag value issued from the queue memory 10 is written as content of the fourth field (data 2 field) of the data latched in the pipeline register $11_{11}$. The contents of the other field of the data latched to the pipeline register $11_{11}$ are the same as those of the data issued from the pipeline register $11_{10}$. Thus, the output token adding a new tag becomes as shown in FIG. 3(c) and is issued by the action of the control element $21_{11}$.

At the issuing of the token, the control element $21_{11}$ informs external circuitry that issuing of the token is imminent by switching an output ready signal 48 to logical "1" after a response signal 49 becomes logical "1". Further, the control element $21_{11}$ recognizes the receiving of the token by external circuitry by detecting a response signal 49 at a logical "0" level, turns the output ready signal 48 to logical "0". When this sequence is complete, the first data word is issued. Next, the second word is latched. When the latching is completed, the latch signal $15_{11}$ varies as "0"→"1"→"0"→, and the trigger signal 31 varies as "0"→"1"→"0". In response to the negative edge of the transition of the trigger signal, the added-tag value is swept out from the queue memory, and the tag adding processing and the post-processing are executed concurrently.

Like the first embodiment, the tag-adding process and the tag-restoring process of the second embodiment are executed by pipeline processing. Furthermore, both processes are executed in parallel. Therefore, the data processing apparatus of the second embodiment has a higher execution speed and superior processing capability than a conventional data processing apparatus. Further, the data processing apparatus itself operates as a queue buffer memory by reason of the pipeline registers $11_9$–$11_{13}$. The processing speed can be improved while maintaining the processing capability (throughput), since the number of pipeline processing steps of the tag-adding process may be decreased in comparison with the first embodiment. Moreover, the architecture of the control circuit can be simplified.

In the second embodiment, the input token contains two words as shown in FIG. 3. However, the second embodiment also can be applied to an input token containing three or more words. When the input token contains one word, the control circuits 40 and 41 are further simplified and the multiplexer 13 can be omitted.

Although the invention has been described in its preferred form with a certain degree of particularity, it is understood that the present disclosure of the preferred form has been changed in the details of construction and the combination and arrangement of parts may be restored without departing from the spirit and the scope of the invention as hereinafter claimed.

We claim:

1. A tag data processing apparatus for a data flow computer wherein tag data, representing an identifier of the context of program execution, and operation instructions are carried on tokens moving in first in-first out queues, said tag data processing apparatus comprising:

a plurality of serially connected pipeline registers for holding and transmitting tokens having tag data associated therewith, each pipeline register having an input end, an output end, and an enable lead, wherein said output end of a preceding pipeline register is connected to said input end of a succeeding pipeline register;

queue memory means for storing usable tag data to be added to tokens having a tag add instruction and for storing tag data from tokens having a restore instruction, said queue memory means having a data input end operatively connected with said output ends of said pipeline registers, a data output end operatively connected with said input ends of said pipeline registers and having an enable lead; and control means, operatively connected to said pipeline registers, including:

means for detecting that a token in one of said pipeline registers is a tagged token, and has one of a tag restoring instruction or a tag adding instruction;

means for producing signals on said enable lead of said queue memory means for (a) writing the tag of a tagged token that is detected to have a tag restoring instruction to said queue memory means, and (b) writing a tag from said queue memory means to a tagged token which has a tag adding instruction, means for erasing said added tag from said queue memory means; and means for generating clock pulses for moving tokens through said pipeline registers;

said control means causing said queue memory means to store said tags from said tagged token having a tag restoring instruction only when said token is detected to be tagged with said tag restoring instruction and said queue memory means is ready for input;

said control means causing said tag to be erased from said queue memory means only when a particular condition is satisfied, and said control means causing said tag from the output of said queue memory means to be written to said token only when said token is determined to have a tag adding instruction and said queue memory means is ready to produce output.

2. A tag data processing apparatus as in claim 1 wherein said control means generates a shift-in pulse for said writing the tag of a tagged token with a tag restoring instruction to the queue memory means, and generates a shift-out pulse for said erasing said added tag from the queue memory means.

* * * * *